United States Patent [19]

Lee

[11] Patent Number: 5,999,169

[45] Date of Patent: *Dec. 7, 1999

[54] COMPUTER GRAPHICAL USER INTERFACE METHOD AND SYSTEM FOR SUPPORTING MULTIPLE TWO-DIMENSIONAL MOVEMENT INPUTS

[75] Inventor: Bobby Christopher Lee, Arcadia, Calif.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/708,145

[22] Filed: Aug. 30, 1996

[51] Int. Cl.[6] .................................................. G09G 5/08
[52] U.S. Cl. .................................... 345/163; 345/146
[58] Field of Search .................................. 345/157, 145, 345/163, 146, 167, 173, 179

[56] References Cited

U.S. PATENT DOCUMENTS

| | | | |
|---|---|---|---|
| 5,021,771 | 6/1991 | Lachman | 340/709 |
| 5,172,102 | 12/1992 | Iwamura et al. | 345/125 |
| 5,228,124 | 7/1993 | Kaga et al. | 395/161 |
| 5,263,134 | 11/1993 | Paal et al. | 345/123 |
| 5,313,229 | 5/1994 | Gilligan et al. | |
| 5,374,942 | 12/1994 | Gilligan et al. | |
| 5,446,481 | 8/1995 | Gillick et al. | 345/163 |
| 5,473,344 | 12/1995 | Bacon et al. | |
| 5,512,892 | 4/1996 | Corballis et al. | 341/22 |
| 5,530,455 | 6/1996 | Gillick et al. | 345/163 |
| 5,586,243 | 12/1996 | Barber et al. | 345/145 |
| 5,666,499 | 9/1997 | Bandel et al. | 345/146 |
| 5,691,748 | 11/1997 | Fukuzaki | 345/173 |
| 5,694,150 | 12/1997 | Sigona et al. | 345/146 |
| 5,731,801 | 3/1998 | Fukuzaki | 345/146 |

FOREIGN PATENT DOCUMENTS

0 016 395   3/1980   European Pat. Off. ........ G05D 3/10

*Primary Examiner*—Regina Liang
*Attorney, Agent, or Firm*—McGinn & Gibb, P.C.; Romualdis Strimaitis, Esq.

[57] ABSTRACT

A method and system are disclosed, for providing a user interface with a graphical user interface (GUI) computer system. The method comprising the steps of receiving a user input command signal, the signal including first and second signals, representative of movements of respective first and second user input mechanisms for two-dimensional movements, resolving the first and second signals from the user input command signal, operating a first displayed symbol based on the first signal, and operating a second displayed symbol based on the second signal. The invention is advantageously practiced in an environment in which the user has a plurality of two-dimensional movement input devices, such as a mouse having a joystick-type pointing device as well as the surface contact ball on its underside. A system in accordance with the invention provides the user with many advantageous features, such as the ability to scroll, in the up/down and left/right directions, the content of an image partially displayed by an application window, to move forward/backward through a sequence of frames displayed by an application window, to move a cursor over the GUI display in the up/down and left/right directions, and to move a special function sub-window, such as a magnifier, over the GUI display in the up/down and left/right directions.

36 Claims, 4 Drawing Sheets

COMPUTER GRAPHICAL USER INTERFACE METHOD AND SYSTEM FOR SUPPORTING MULTIPLE TWO-DIMENSIONAL MOVEMENT INPUTS

FIELD OF THE INVENTION

The invention generally relates to the field of computer graphical user interfaces (GUIs). More specifically, the invention relates to user interface systems and methods for supporting activities such as symbol movement and selection on a GUI system.

BACKGROUND OF THE INVENTION

Since the advent of the graphical user interface (GUI) in the early 1980s, computers have employed, as user input devices, devices that allow a user to perform two basic functions, first, a two-dimensional movement function, such as moving a cursor around on a two-dimensional display, and, second, a pulsing or "clicking" function, that allows a user to select a function associated with a particular position on the display.

In a GUI, information displayed includes object symbols, such as windows, icons, slider bars, soft "buttons", etc. The two-dimensional movement function allows a user to move a cursor to an area of the screen within which a desired object symbol is located. The clicking function allows the user to select, operate, or manipulate the object symbols, and, in so doing, perform computer operations.

The number of such functions that a GUI supports is wide and varied. For instance, any window that shows a portion of an image (such as a word processor showing a portion of a lengthy document) provides for scrolling through the image. A slider bar is provided for this purpose. For incremental scrolling, the user moves the cursor to an up or down arrow, and holds a click button down to invoke the scrolling function. For long-distance moves, the user positions the cursor on a slider block, holds a click button down, and moves the mouse to drag the slider block along the slider bar. A portion of the image, in a position proportional to the position of the block along the slider bar, is displayed. This arrangement is both easy and intuitive for the user.

Other functions include the "drag and drop" function, similar to that used with the slider block, but applicable to icons and other objects in the GUI display.

As application software has increased in sophistication and "user-friendliness," more and more of the functionality of a computer has migrated from a typewriter-style keyboard to a user interface device providing this functionality.

The most commonly employed user input mechanism is a mouse. A mouse is a hand-held device having a surface contact member such as a ball. The user moves the mouse over a work surface such as a table top, causing the ball to roll. Sensors within the device detect the rolling, and translate it into two-dimensional movement signals analogous to the user's movement of the mouse. The signals are sent over a wire to a computer, in accordance with a known mouse interface protocol. The computer runs a mouse driver application, which interprets the movement signals and directs the movement, on the GUI, of a symbol such as a cursor. The mouse also has click buttons, preferably two, which are positioned so that the user can conveniently press the buttons with his/her fingers, without having to change the grip on the mouse.

Computer software, in the form of "mouse driver" programs, have been employed along with these physical apparatus. A mouse driver essentially receives signals through a mouse interface (typically a serial cable), interprets the signals in terms of movement (two dimensions, in the plus and minus directions each) and selection (mouse button clicking), and directs the operating system and/or application programs to perform a desired function.

A major advance was made when IBM Corporation developed the TrackPoint II™ and TrackPoint III™ pointing device (hereinafter generally referred to as "TrackPoint devices"). A TrackPoint device includes a small, joystick-like member which is mounted in a keyboard, between the keys. Click buttons are provided on the keyboard also, preferably centered and in front of a space bar.

The TrackPoint device enhanced the portability of small, laptop computers, because all the functionality of a mouse fit within the keyboard. It was not necessary to carry the mouse separately, or to find a flat surface for using the mouse.

However, because graphical user interfaces are so powerful, more sophisticated ways of exploiting the user interface capabilities have been pursued. For instance, since GUI applications provide scrolling functions as well as symbol selection functions, and since functions both inside an application and outside on the desktop/operating system employ selection functions, it is likely to be a convenience for the user to have multiple cursor manipulation apparatus.

To further expand the capabilities of a user interface device for use with a GUI computer, mice have had added apparatus to provide, in effect, a Z axis of movement, to go along with the X and Y axes of movement provided by ordinary mice. For instance, in U.S. Pat. No. 5,530,455, Gillick et al., "Roller Mouse for Implementing Scrolling in Windows Applications" and U.S. Pat. No. 5,446,481, Gillick et al., :Multidimensional Hybrid Mouse for Computers", a Z axis roller is added.

However, these additional features are limited in their use, since they are useful only for tasks for which one additional dimension is needed.

IBM Corp. has developed a keyboard with two Track-Point devices, positioned at two different sites within the keyboard. Because there are two such devices, each having full two-dimensional capability, added functionality and flexibility are realized.

Accordingly, the user, when choosing a type of interface device to use, has many options. In fact, a user's manual dexterity is capable of making effective use of a plurality of such devices. However, heretofore, GUI software has been limited in its ability to support user commands. For instance, in a word processor, a user must use the same cursor, and the same interface mechanism, for scrolling through a document, selecting text for cutting and pasting, etc. Also, if the user is both operating an application and moving or invoking objects on the desktop, the same cursor and interface device are again used. Therefore, conventional GUI software and interface device drivers have had the drawback of limiting the user's efficiency and productivity by not allowing users to take full advantage of the graphical user interface's capacity to perform quick and convenient functions, responsive to user commands.

SUMMARY OF THE INVENTION

It is therefore an object of the invention to provide a method and system for providing a user interface with a graphical user interface (GUI) computer system.

The method of the invention comprises the following steps:

First, a user input command signal is received. In accordance with the invention, the signal is compatible in format with conventional user interface signals, such as mouse signals. However, the user interface signal includes first and second signals, which are representative of movements of respective first and second user input mechanisms for two-dimensional movements.

The user input signal is then resolved, by a demultiplexing process, into first and second signals. The first and second signals are representative of two-dimensional movements of first and second, distinct, user interface devices. A preferred embodiment of the invention employs a user interface device which is the subject of co-pending, co-assigned U.S. patent application Ser. No. 80/706,019, filed Aug. 30, 1996, Barber et al., "Hand Held Computer Interface Device Having Multiple Two-Dimensional User Command Inputs," directed to a mouse having a joystick-type pointing device disposed thereon. Thus, the first signal is produced by mouse movement, in a familiar manner. The second signal is produced by the pointing device. The two signals are multiplexed on board the mouse, to produce the above-mentioned user input signal.

After the user input signal as been resolved into the first and second signals, the method proceeds by operating a first displayed symbol based on the first signal, and operating a second displayed symbol based on the second signal.

These steps of operating include any of the following:
(1) scrolling, in the up/down and left/right directions, the content of an image partially displayed by an application window,
(2) moving forward/backward through a sequence of frames displayed by an application window,
(3) moving a cursor over the GUI display in the up/down and left/right directions, and
(4) moving a special function sub-window over the GUI display in the up/down and left/right directions.

Accordingly, a system and method according to the invention allow the user to take better advantage of multiple, two-dimensional user input command mechanisms to further enhance the ease and efficiency offered by the GUI environment.

The invention is advantageously used in connection with a user input device, such as a mouse having a TrackPoint device as well as a surface contact ball for movement over a work surface, as described in co-pending, co-assigned U.S. patent application Ser. No. 80/706,019.

While the invention is primarily disclosed as a method, it will be understood by a person of ordinary skill in the art that an apparatus, such as a conventional data processor, including a CPU, memory, I/O, program storage, a connecting bus, and other appropriate components, could be programmed or otherwise designed to facilitate the practice of the method of the invention. Such a processor would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. It will be understood that such apparatus and articles of manufacture also fall within the spirit and scope of the invention.

DESCRIPTION OF THE PREFERRED EMBODIMENT

Figure 1:
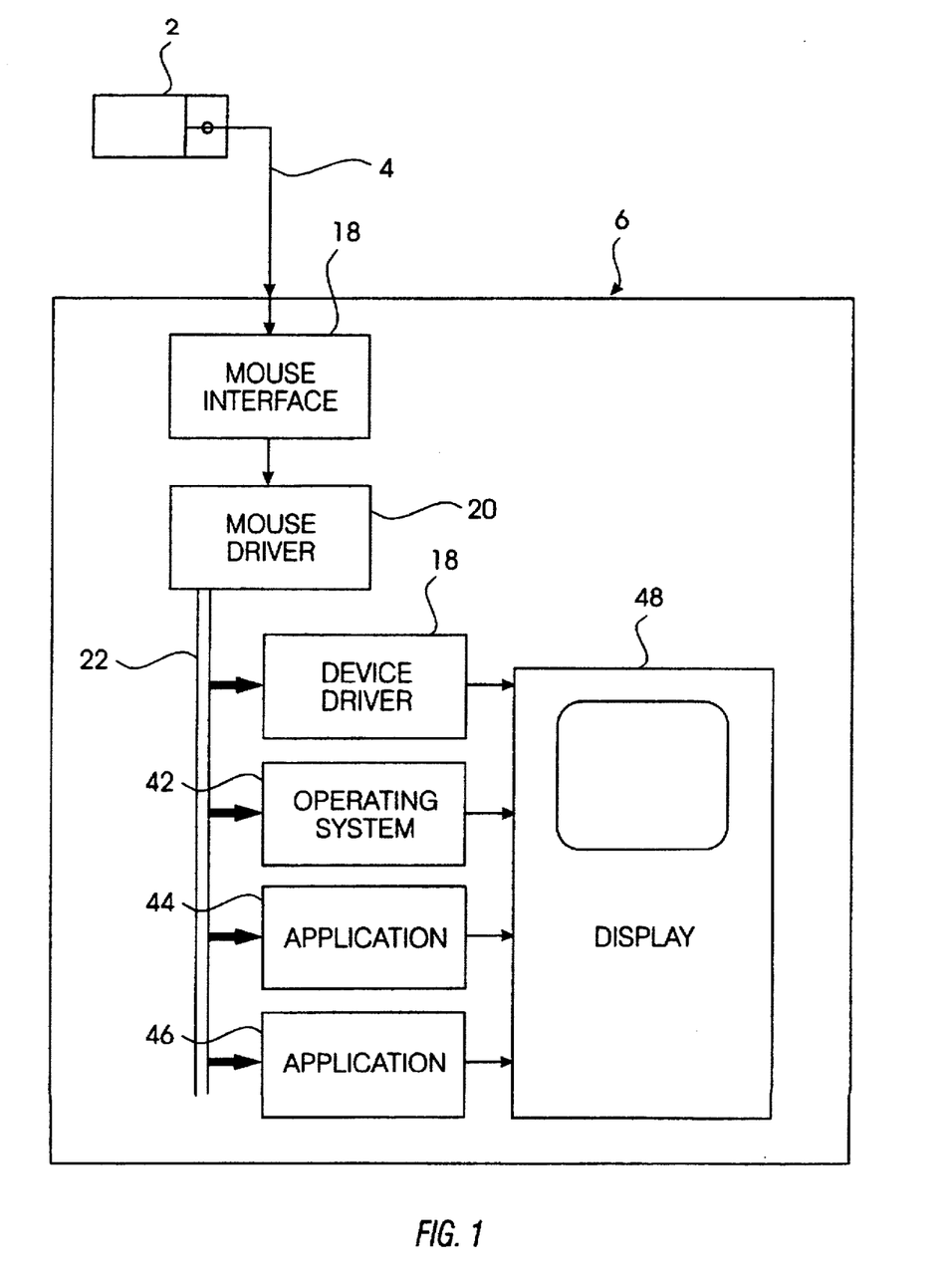
FIG. 1 is a system block diagram of the invention and its operating environment.

FIG. 1 is a block diagram of a computer system employing the method of the invention. A user command input device 2 produces movement and selection signals, which are provided through an interface such as a standard mouse cable 4 to a computer 6.

In accordance with the invention, the device 2 includes a plurality of two-dimensional movement inputs, and produces a multiplexed signal which is compatible with the standard mouse interface, but which conveys user command information from the plurality of inputs.

Figure 2:
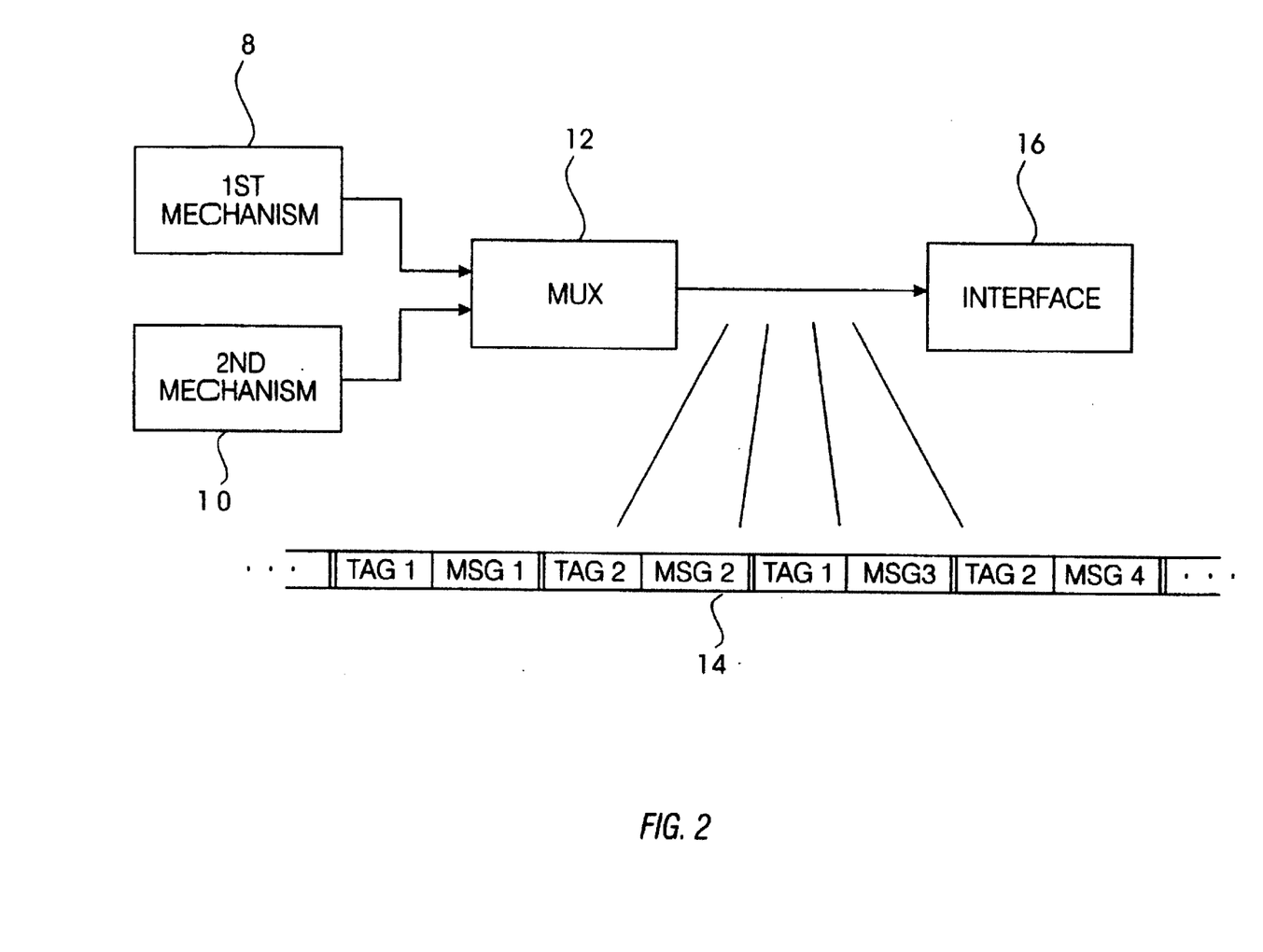
FIG. 2 is a block diagram showing the functionality of a user input device for use with the invention.

A more detailed illustration of the operation of the device 2 is given in FIG. 2. First and second mechanisms 8 and 10 (such as a mouse surface contact ball and a TrackPoint device) produce signals which are provided to a multiplexer 12. In accordance with standard practice for providing mouse signals to a computer, the signals produced by the mechanisms 8 and 10 include a sequence of segmented, or segmentable, messages.

Note, by the way, that, for the two-TrackPoint-device keyboard mentioned in the Background section, the interface with the computer provides two separate links, so that the GUI support software within the computer separately handles the movement signals from the two TrackPoint devices. The interface here described does not require the extra interface channel.

The multiplexer 12 receives the message segments and tags them with a ID specifying which mechanism they came from. The resultant multiplexed signal is thus in a general format 14, in which a single signal stream includes packets in a sequence, each packet including a tag identifying one of the mechanisms 8 and 10 as a source, and including a message representative of a movement signal and/or click button signal produced by that mechanism. That resultant signal is provided to an interface 16, such as the standard mouse cable 4 of FIG. 1. Note that the interface 16 is a single interface, so that an apparatus in accordance with the invention does not require multiple interfaces, as did the above-discussed prior art IBM keyboard having two TrackPoint devices. Note, further, that the single interface 16 is backward compatible with conventional mouse interfaces.

Returning to FIG. 1, the multiplexed signal 14 is received over the cable 4 at an input mouse interface 18. The signal is provided to a mouse driver 20. The driver 20 includes a demultiplexer, which demultiplexes the signal to produce separate signals corresponding with the separate user input mechanisms 8 and 10. In the course of this demultiplexing, the ID tags are stripped out, and the various segmented messages are grouped separately, and provided as separate outputs.

A bus 22, shown in FIG. 1, schematically represents a plurality of separate lines, functional routes, etc., for carrying the respective signals produced by the demultiplexer. Suitable implementations for separately providing the demultiplexed signals may be used, in accordance with the particular system requirements.

The bus 22 routes the signals separately to the appropriate destinations. The destinations are selectable by the user, in a manner described below. For illustrative purposes, the various lines of the bus 22 are coupled to various software modules, including a device driver 40, an operating system 42, and applications 44 and 46. As per the operation of those software modules, and in accordance with the user's manipulation of the various user input mechanisms to produce the respective signals, the software modules 40, 42, 44, and 46 cause information to be displayed on a display 48 as per the detailed descriptions which follow.

Figure 3:
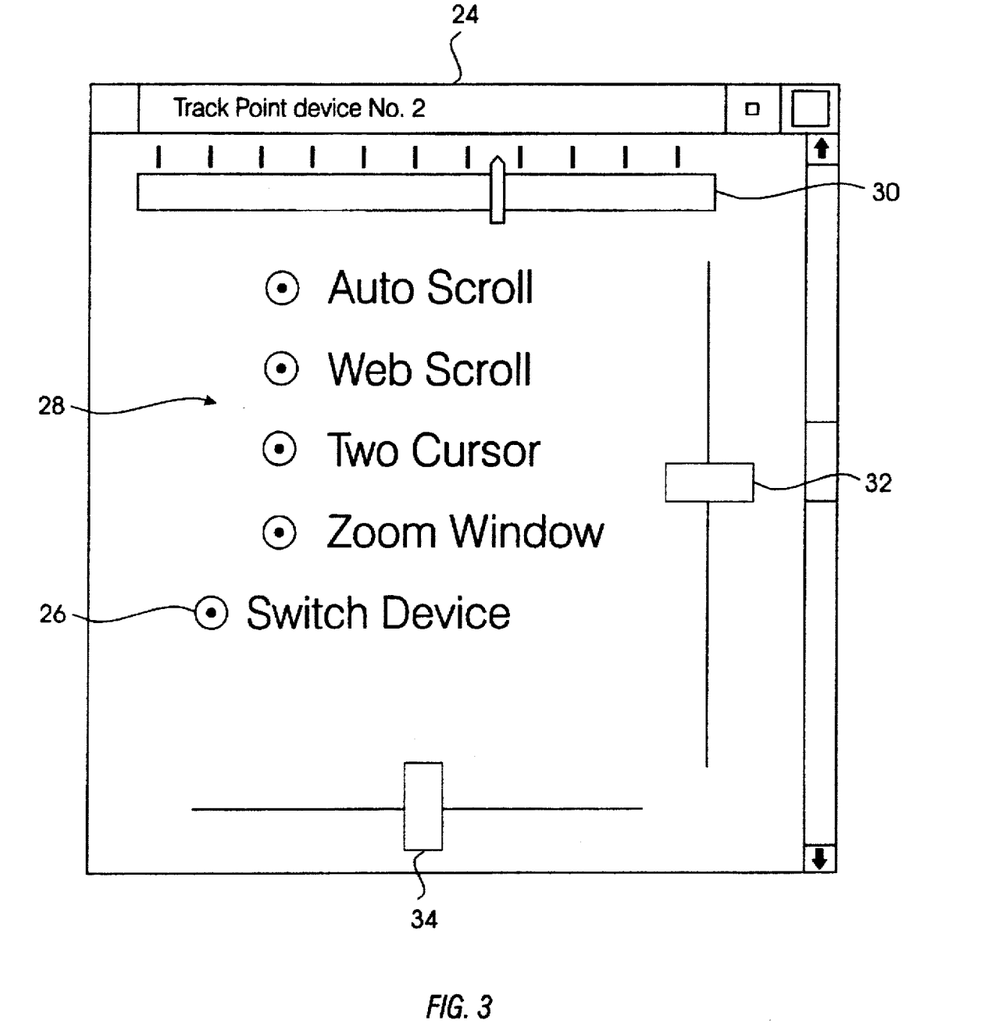
FIG. 3 is a view of a GUI display showing functionality used in accordance with the invention.

Referring to FIG. 3, part of the functionality of the mouse driver 20 of the invention is to provide a user interface window, as shown in FIG. 3.

It is assumed that a desired number of user interface mechanisms are suitably coupled to the computer 6. For instance, a mouse having a TrackPoint device may be installed to the mouse port of the computer 6, thereby providing two user interface mechanisms: first, the mouse itself, with motion determined by the mouse's surface contact ball, and second, the TrackPoint device.

In accordance with the invention, the driver 20 maps the mechanisms to internally maintained IDs. For each ID, the driver provides the user with configuration software, preferably in the form of a window. When the driver is installed, an icon appears, such as on the desktop. When the user selects the icon, a window such as that of FIG. 3 appears.

The window, at any given time, applies to one of the user interface mechanisms, and so identifies itself to the user. For instance, the mouse surface contact ball might be mapped as device 1, and the TrackPoint device mapped as device 2. As shown, the header at the top of the window identifies which device the window currently applies to.

The window also includes a function for switching to another device, shown as a software switch 26. Where only two user input mechanisms are used, the switch 26 can simply toggle between them. Where a greater number of devices are available to the user, the switch 26 may be replaced by a button which, when pressed, causes a menu of installed devices to be displayed. Then, the user simply selects the user input mechanism he/she wants to work with.

The window includes a bank of functions 28, and soft switches for allowing the user to select which one of the desired functions the selected user input mechanism is to apply to. (Suitable safeguards may be used for warning or disallowing when one user input mechanism is to be set to a function already allocated to another user input mechanism.)

Additional controls, shown generally as 30, 32, and 34 may be provided as appropriate for providing user control over the magnitude of operation of the particular task that the user input mechanism is assigned to. This will be explained in more detail in connection with the descriptions of the functions which follow.

Depending on the application being run, a wide variety of different operations may advantageously employ concurrent cursor activities such as those made possible by an apparatus according to the invention. The functions are selectable from the bank 28.

One function supported in accordance with the invention is that of two-dimensional scrolling ("AutoScroll"). Where a window displays a portion of a larger image, such as a lengthy document in a word processor, a user input mechanism may be used for two-dimensional scrolling. A noteworthy advantage of using a two-dimensional user input mechanism for scrolling is that the image can be scrolled in both the X and Y directions. Conventionally, scrolling has been done by pressing a click button when the cursor is positioned on a slider bar or equivalent graphical tool, so scrolling could only be done in one direction at a time.

Also, the speed of scrolling may be related to the magnitude of manipulation of the user input mechanism. For instance, where a TrackPoint device is so used, the scrolling speed is related to the magnitude of the force exerted by the user's fingertip. A suitable force-to-speed transfer function is preferably used, such as that described in co-assigned U.S. patent application Ser. No. 08/316,983, Barrett et al., "Graphical User Interface Cursor Positioning Device Having a Negative Inertia Transfer Function," now issued as U.S. Pat. No. 5,570,111.

The controls 30, 32, and 34, or controls having other suitable formats, may be used for allowing the user to select a desired transfer function, scale the transfer function to modify the sensitivity and responsiveness, etc.

Another function is designated in FIG. 3 as "Web Scroll". This function assumes that an application has displayed a sequence of pages, documents, etc., and that a history of that sequence has been maintained. The user input mechanism is used here to step, forward and backward, through the sequence of displayed pages. Thus, this function has particular applicability to Web browsers.

A preferred implementation is to map the click buttons of the user input mechanism to the "forward" and "backward" functions of the applications. For instance, clicking the left mouse button might go to the previously viewed page, and clicking the right button might go to the next-viewed page.

An alternative implementation would be to use the two-dimensional movement element of the user input mechanism for stepping through the sequence of pages. For instance, a leftward press of a TrackPoint device, having a duration and magnitude which satisfies a predetermined threshold or other criterion, might be recognized as a user command to go to the previously viewed page. A similar rightward press is interpreted as a command to go to the next-viewed page. For details on the recognition of particular user input signatures for alternative functions, see co-assigned U.S. patent application Ser. No. 08/483,594, Marks et al., "Enhanced Program Access in a Graphical User Interface," now issued as U.S. Pat. No. 5,586,243.

Yet another function is to allow for two cursors ("Two Cursor"). Within some individual applications, this can be useful. For instance, in a word processor, one cursor can be used for scrolling, while another can be used for selecting text for cutting and pasting. See also co-pending, co-assigned U.S. patent application Ser. No. 08/631,110, Barber et al., "Multiple Display Pointers for Computer Graphical User Interfaces."

Alternatively, one cursor can be used within an application, while another is used by the operating system, such as on a desktop.

Figure 4:
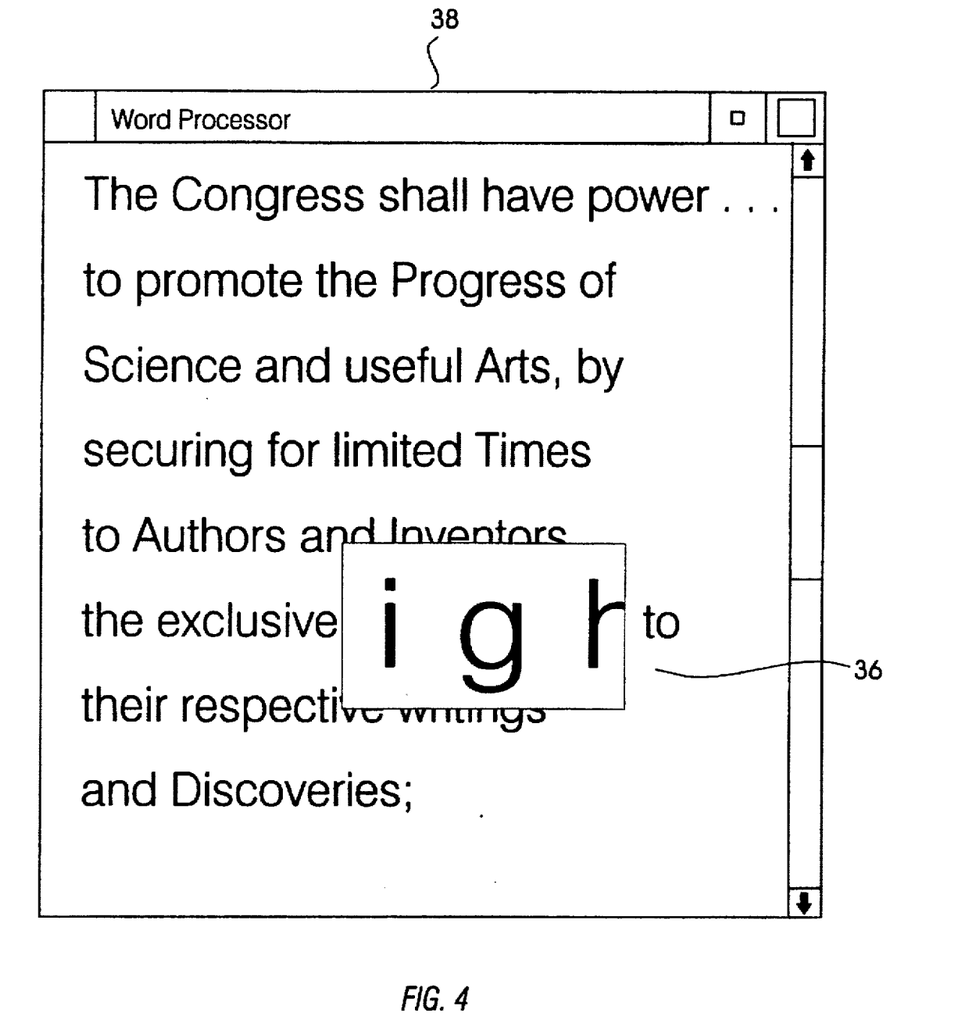
FIG. 4 is a view of a GUI display showing functionality used in accordance with the invention.

Finally, a user input mechanism can be mapped, preferably by the operating system but alternatively within an application, to a special function sub-window, such as a magnifier (FIG. 4). In the illustrated example, the special function sub-window is a magnifier 36, which is positioned on a word processor application window 38. As shown, the magnifier 36 magnifies the GUI content (such as text) which appears on the display in the position where the magnifier is located.

In accordance with the invention, a user input mechanism is mapped to the magnifier 36. As the user input mechanism is manipulated to produce two-dimensional movement, the magnifier 36 moves, in the same manner that a cursor would move. The dimensions of the sub-window, the magnification power, and other suitable parameters may be adjusted by the user through use of controls such as the controls 30, 32, and 34 of FIG. 3. Alternatively, a series of predetermined values for the sub-window size, magnification power, or the like can be established. The click buttons are configured to assign the click buttons to that selectable function. Then, the user can increase or decrease the function, such as the magnification power, by clicking the left or right buttons to increase and decrease it, respectively, through the predetermined set of values.

It is believed that the special function sub-window, where used as a magnifier, may best be supported by the operating system, so that it can be moved all over the display, across window boundaries. However, other special functions may be particularly suited for use within a particular application, and would then be limited within the application window.

Note, in general, that applications, etc., have been described in terms of "windows." It should be understood that this terminology is not intended to limit the scope of GUI applications which can advantageously employ the invention. For instance, if an application is displayed in "full screen" mode, rather than as a window occupying only a portion of the display, all of the principles pertaining to the above discussion apply equally.

Using the foregoing specification, the invention may be implemented using standard programming and/or engineering techniques using computer programming software, firmware, hardware or any combination or subcombination thereof. Any such resulting program(s), having computer readable program code means, may be embodied or provided within one or more computer readable or usable media such as fixed (hard) drives, disk, diskettes, optical disks, magnetic tape, semiconductor memories such as read-only memory (ROM), etc., or any transmitting/receiving medium such as the Internet or other communication network or link, thereby making a computer program product, i.e., an article of manufacture, according to the invention. The article of manufacture containing the computer programming code may be made and/or used by executing the code directly from one medium, by copying the code from one medium to another medium, or by transmitting the code over a network.

An apparatus for making, using, or selling the invention may be one or more processing systems including, but not limited to, a central processing unit (CPU), memory, storage devices, communication links, communication devices, servers, I/O devices, or any subcomponents or individual parts of one or more processing systems, including software, firmware, hardware or any combination or subcombination thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention. While the preferred embodiment of the present invention has been illustrated in detail, it should be apparent that modifications and adaptations to that embodiment may occur to one skilled in the art without departing from the spirit or scope of the present invention as set forth in the following claims.

What is claimed is:

1. A method for providing a user interface with a graphical user interface (GUI) computer system, the GUI computer system including first and second user input mechanisms, which produce respective first and second directional movement signals, the GUI computer system further including means for simultaneously displaying first and second movable displayed symbols, the method comprising the steps of:

receiving the first and second directional movement signals for allowing a user to direct two-dimensional movements of respective ones of the first and second displayed symbols;

multiplexing the first and second directional movement signals to produce a user input command signal;

receiving the user input command signal;

resolving the first and second signals from the user input command signal;

operating the first displayed symbol based on the first signal; and operating the second displayed symbol based on the second signal, wherein, upon actuation of any of said first and second user input mechanisms, a GUI display window is opened, said window, at any given time, applying to one of said first and second user input mechanisms, such that said window identifies to which of said first and second user input mechanisms the window currently applies, said window allowing switching from said one of said first and second user input mechanisms to the other of said first and second user input mechanisms.

2. A method as recited in claim 1, wherein the step of resolving includes:

extracting the units of information from the user input command signal; and generating the first and second signals from the information units based on the associated ID tags.

3. A method as recited in claim 2 wherein the step of resolving further includes:

processing the first signal as a mouse movement signal; and processing the second signal separately.

4. A method as recited in claim 1, wherein:

(a) for the steps of operating the first and second displayed symbols based, respectively, on the first and second signals, the displayed symbol includes one of:
a cursor,
an application window or full-screen application (hereinafter an "application window"), and
a special function sub-window; and (b) each of the steps of operating includes one of the steps of:
scrolling, in the up/down and left/right directions, the content of an image partially displayed by an application window,
moving forward/backward through a sequence of frames displayed by an application window,
moving a cursor over the GUI display in the up/down and left/right directions, and
moving a special function sub-window over the GUI display in the up/down and left/right directions.

5. A method as recited in claim 4, wherein the step of scrolling, in the up/down and left/right directions, the content of an image partially displayed by an application window includes the steps of:

positioning a cursor within the application window containing the partly displayed image; and scrolling the content simultaneously in the up/down and left/right directions as per the signal.

6. A method as recited in claim 4, wherein the step of scrolling, in the up/down and left/right directions, the content of an image partially displayed by an application window includes scrolling at a speed related to a magnitude of manipulation by the user of the respective user input mechanism.

7. A method as recited in claim 4, wherein the step of moving forward/backward through a sequence of frames displayed by an application window includes the steps of:

mapping click buttons of the user input mechanism to the forward and backward directions of movement through the sequence of frames; and displaying successive earlier or later frames of the sequence of frames responsive to clicks of the respective click buttons.

8. A method as recited in claim 7, wherein:

the application window includes a Web browser; and the step of displaying successive earlier or later frames includes displaying successive earlier or later Web pages.

9. A method as recited in claim 4, wherein the step of moving a cursor over the GUI display in the up/down and left/right directions includes the steps of:

performing a context-switching operation in which control of a cursor displayed in the application window is switched to one of the user input mechanisms; and thereafter, moving the cursor responsive to user manipulation of the one of the user input mechanisms.

10. A method as recited in claim 4, wherein the step of moving a special function sub-window over the GUI display in the up/down and left/right directions includes moving a magnifier window.

11. A method as recited in claim 10, wherein the step of moving a special function sub-window further includes the steps of:

(a) mapping the click buttons to functions relating to the power of magnification of the magnifier window; and (b) changing the magnification of the magnifier window responsive to clicks of the respective click buttons.

12. A method as recited in claim 1, wherein the step of multiplexing includes producing a user input command signal which is formatted in accordance with a standard mouse protocol.

13. A system for providing a user interface with a graphical user interface (GUI) computer system, the GUI computer system including first and second user input mechanisms, which produce respective first and second directional movement signals, the GUI computer system further including means for simultaneously displaying first and second movable displayed symbols, the system comprising:

means for receiving the first and second directional movement signals for allowing a user to direct two-dimensional movements of respective ones of the first and second displayed symbols;

means for multiplexing the first and second directional movement signals to produce a user input command signal;

means for receiving the user input command signal;
means for resolving the first and second signals from the user input command signal;

means for operating the first displayed symbol based on the first signal; and means for operating the second displayed symbol based on the second signal, wherein, upon actuation of any of said first and second user input mechanisms, a GUI display window is opened, said window, at any given time, applying to one of said first and second user input mechanisms, such that said window identifies to which of said first and second user input mechanisms the window currently applies, said window allowing switching from said one of said first and second user input mechanisms to the other of said first and second user input mechanisms.

14. A system as recited in claim 13, wherein the means for resolving includes:

means for extracting the units of information from the user input command signal; and means for generating the first and second signals from the information units based on the associated ID tags.

15. A system as recited in claim 14 wherein the means for resolving further includes:

means for processing the first signal as a mouse movement signal; and means for processing the second signal separately.

16. A system as recited in claim 13, wherein:

(a) for the means for operating the first and second displayed symbols based, respectively, on the first and second signals, the displayed symbol includes one of:
a cursor,
an application window or full-screen application (hereinafter an "application window"), and
a special function sub-window; and (b) each of the means operating includes means for performing one of the steps of:
scrolling, in the up/down and left/right directions, the content of an image partially displayed by an application window,
moving forward/backward through a sequence of frames displayed by an application window,
moving a cursor over the GUI display in the up/down and left/right directions, and
moving a special function sub-window over the GUI display in the up/down and left/right directions.

17. A system as recited in claim 16, wherein the means for scrolling, in the up/down and left/right directions, the content of an image partially displayed by an application window includes:

means for positioning a cursor within the application window containing the partly displayed image; and means for scrolling the content simultaneously in the up/down and left/right directions as per the signal.

18. A system as recited in claim 16, wherein the means for scrolling, in the up/down and left/right directions, the content of an image partially displayed by an application window includes means for scrolling at a speed related to a magnitude of manipulation by the user of the respective user input mechanism.

19. A system as recited in claim 16, wherein the means for moving forward/backward through a sequence of frames displayed by an application window includes:

means for mapping click buttons of the user input mechanism to the forward and backward directions of movement through the sequence of frames; and means for displaying successive earlier or later frames of the sequence of frames responsive to clicks of the respective click buttons.

20. A system as recited in claim 19, wherein:

the application window includes a Web browser; and the means for displaying successive earlier or later frames includes means for displaying successive earlier or later Web pages.

21. A system as recited in claim 16, wherein the means for moving a cursor over the GUI display in the up/down and left/right directions includes:

means for performing a context-switching operation in which control of a cursor displayed in the application window is switched to one of the user input mechanisms; and means, operable thereafter, for moving the cursor responsive to user manipulation of the one of the user input mechanisms.

22. A system as recited in claim 16, wherein the means for moving a special function sub-window over the GUI display in the up/down and left/right directions includes means for moving a magnifier window.

23. A system as recited in claim 22, wherein the means for moving a special function sub-window further includes:

(a) means for mapping the click buttons to functions relating to the power of magnification of the magnifier window; and (b) means for changing the magnification of the magnifier window responsive to clicks of the respective click buttons.

24. A system as recited in claim 13, wherein the means for multiplexing includes means for producing a user input command signal which is formatted in accordance with a standard mouse protocol.

25. A computer program product, for use with a graphical user interface (GUI) computer system, for providing a user interface with the computer system, the computer system including first and second user input mechanisms, which produce respective first and second directional movement signals, the computer system further including means for simultaneously displaying first and second movable displayed symbols, the computer program product comprising:

a computer readable medium;

means, provided on the medium, for directing the computer system to receive the first and second directional movement signals for allowing a user to direct two-dimensional movements of respective ones of the first and second displayed symbols;

means, provided on the medium, for directing the computer system to multiplex the first and second directional movement signals to produce a user input command signal;

means, provided on the medium, for directing the computer system to receive the user input command signal;

means, provided on the medium, for directing the computer system to resolve the first and second signals from the user input command signal;

means, provided on the medium, for directing the computer system to operate the first displayed symbol based on the first signal; and means, provided on the medium, for directing the computer system to operate the second displayed symbol based on the second signal, wherein, upon actuation of any of said first and second user input mechanisms, a GUI display window is opened, said window, at any given time, applying to one of said first and second user input mechanisms, such that said window identifies to which of said first and second user input mechanisms the window currently applies, said window allowing switching from said one of said first and second user input mechanisms to the other of said first and second user input mechanisms.

26. A computer program product as recited in claim 25, wherein the means for directing to resolve includes:

means, provided on the medium, for directing the computer system to extract the units of information from the user input command signal; and means, provided on the medium, for directing the computer system to generate the first and second signals from the information units based on the associated ID tags.

27. A computer program product as recited in claim 26, wherein the means for directing to resolve further includes:

means, provided on the medium, for directing the computer system to process the first signal as a mouse movement signal; and means, provided on the medium, for directing the computer system to process the second signal separately.

28. A computer program product as recited in claim 25, wherein:

(a) for the means for directing to operate the first and second displayed symbols based, respectively, on the first and second signals, the displayed symbol includes one of:

a cursor, an application window or full-screen application (hereinafter an "application window"), and a special function sub-window; and (b) each of the means for directing to operate includes means, provided on the medium, for directing the computer system to perform one of the steps of:

scrolling, in the up/down and left/right directions, the content of an image partially displayed by an application window, moving forward/backward through a sequence of frames displayed by an application window, moving a cursor over the GUI display in the up/down and left/right directions, and moving a special function sub-window over the GUI display in the up/down and left/right directions.

29. A computer program product as recited in claim 28, wherein the means for directing to scroll, in the up/down and left/right directions, the content of an image partially displayed by an application window includes:

means, provided on the medium, for directing the computer system to position a cursor within the application window containing the partly displayed image; and means, provided on the medium, for directing the computer system to scroll the content simultaneously in the up/down and left/right directions as per the signal.

30. A computer program product as recited in claim 28, wherein the means for directing to scroll, in the up/down and left/right directions, the content of an image partially displayed by an application window includes means, provided on the medium, for directing the computer system to scroll at a speed related to a magnitude of manipulation by the user of the respective user input mechanism.

31. A computer program product as recited in claim 28, wherein the means for directing to move forward/backward through a sequence of frames displayed by an application window includes:

means, provided on the medium, for directing the computer system to map click buttons of the user input mechanism to the forward and backward directions of movement through the sequence of frames; and means, provided on the medium, for directing the computer system to display successive earlier or later frames of the sequence of frames responsive to clicks of the respective click buttons.

32. A computer program product as recited in claim 31, wherein:

the application window includes a Web browser; and the means, provided on the medium, for directing the computer system to display successive earlier or later frames includes means, provided on the medium, for directing the computer system to display successive earlier or later Web pages.

33. A computer program product as recited in claim 28, wherein the means for directing to move a cursor over the GUI display in the up/down and left/right directions includes:

means, provided on the medium, for directing the computer system to perform a context-switching operation in which control of a cursor displayed in the application window is switched to one of the user input mechanisms; and means, provided on the medium, operable thereafter, for directing the computer system to move the cursor responsive to user manipulation of the one of the user input mechanisms.

34. A computer program product as recited in claim 28, wherein the means for directing to move a special function sub-window over the GUI display in the up/down and left/right directions includes means, provided on the medium, for directing the computer system to move a magnifier window.

35. A computer program product as recited in claim 34, wherein the means for directing to move a special function sub-window further includes:

(a) means, provided on the medium, for directing the computer system to map the click buttons to functions relating to the power of magnification of the magnifier window; and (b) means, provided on the medium, for directing the computer system to change the magnification of the magnifier window responsive to clicks of the respective click buttons.

36. A computer program product as recited in claim 25, wherein the means for directing to multiplex includes means, provided on the medium, for directing the computer system to produce a user input command signal which is formatted in accordance with a standard mouse protocol.

* * * * *